United States Patent
Wan et al.

(10) Patent No.: US 8,489,240 B2
(45) Date of Patent: Jul. 16, 2013

(54) CONTROL SYSTEM FOR INDUSTRIAL WATER SYSTEM AND METHOD FOR ITS USE

(75) Inventors: Zhaoyang Wan, Yardley, PA (US); Gary E. Geiger, Richboro, PA (US); Yong Zhang, Shanghai (CN); Yu Zhang, Shanghai (CN)

(73) Assignee: General Electric Company, Schenectady, NY (US)

( * ) Notice: Subject to any disclaimer, the term of this patent is extended or adjusted under 35 U.S.C. 154(b) by 1046 days.

(21) Appl. No.: 11/833,282

(22) Filed: Aug. 3, 2007

(65) Prior Publication Data
US 2009/0035180 A1    Feb. 5, 2009

(51) Int. Cl.
*G01N 33/18*    (2006.01)

(52) U.S. Cl.
USPC ............... 700/266; 702/22; 702/23; 702/24; 702/25; 702/30; 702/31; 702/32; 702/109; 435/3; 435/286.1; 435/812; 436/55; 422/62; 137/11; 137/157; 137/180; 261/1; 261/130

(58) Field of Classification Search
USPC ............ 700/266; 435/3, 286.1, 812; 436/55; 702/22–25, 30, 31, 32, 109; 422/62; 137/11, 137/157, 180; 261/1, 130
See application file for complete search history.

(56) References Cited

U.S. PATENT DOCUMENTS

| | | | |
|---|---|---|---|
| 5,171,450 | A | 12/1992 | Hoots |
| 5,521,814 | A | 5/1996 | Teran et al. |
| 5,923,571 | A | 7/1999 | Gunther |
| 6,068,012 | A | 5/2000 | Beardwood et al. |
| 6,153,110 | A | 11/2000 | Richardson et al. |
| 6,510,368 | B1 | 1/2003 | Beardwood et al. |
| 6,535,795 | B1 | 3/2003 | Schroeder et al. |
| 7,135,118 | B2 | 11/2006 | Descloux |

FOREIGN PATENT DOCUMENTS

| | | |
|---|---|---|
| EP | 1503264 A1 | 2/2005 |
| WO | 01/98218 A2 | 12/2001 |
| WO | 2007/038533 A2 | 4/2007 |

OTHER PUBLICATIONS

International Search Report issued in connection with corresponding PCT Application No. PCT/US2008/067680 on Jun. 9, 2010.
The Written Opinion issued in connection with corresponding PCT Application No. PCT/US2008/067680 on Jun. 9, 2010.

*Primary Examiner* — Brian R Gordon
*Assistant Examiner* — Shogo Sasaki
(74) *Attorney, Agent, or Firm* — GE Global Patent Operation; Catherine J. Winter

(57) ABSTRACT

A control system for industrial water systems that utilizes multiple measurements of information and models to decide optimal control actions to maximize corrosion/scaling/fouling inhibition and particulate dispersancy performance and minimize cost of water and treatment chemicals. This system is capable of automatic operation for a wide range of process conditions, ensures multiple performance objectives, achieves robust operation under a variety or un-measurable disturbances and achieves the least costly solution delivery.

15 Claims, 6 Drawing Sheets

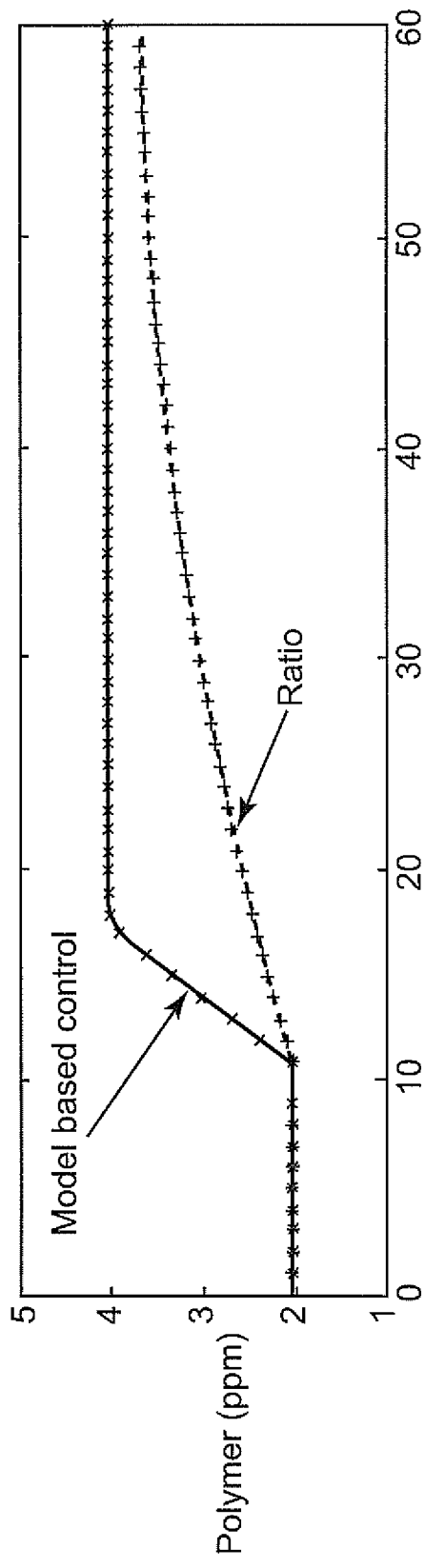
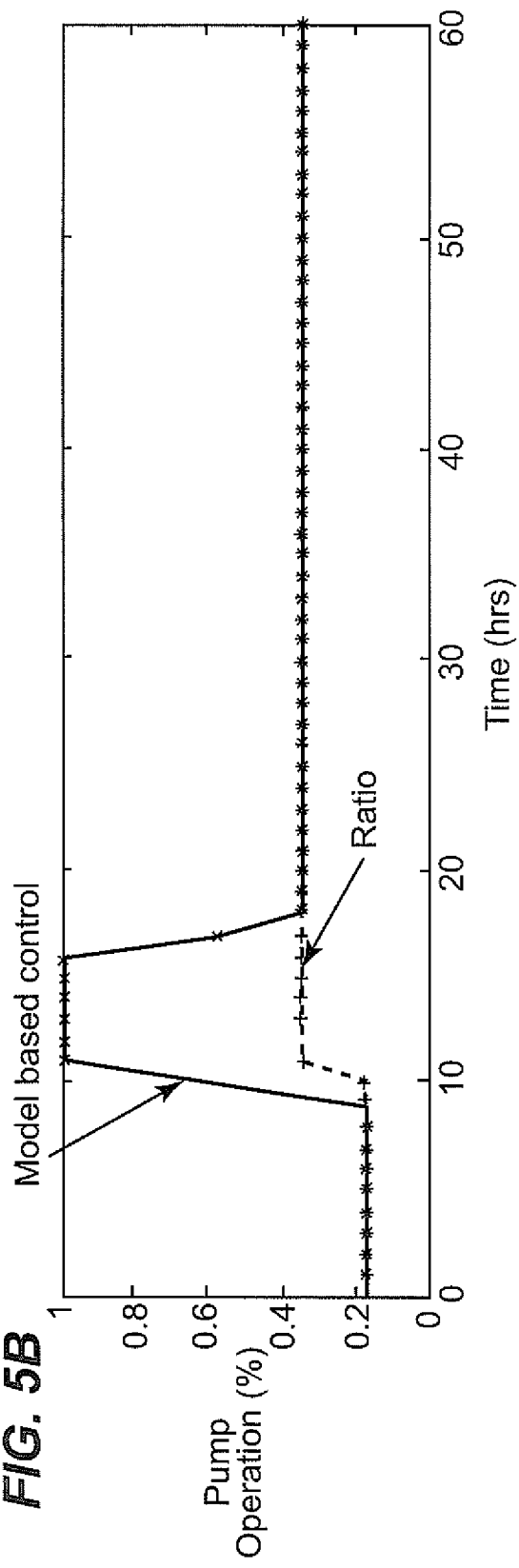
FIG. 5A
FIG. 5B

CONTROL SYSTEM FOR INDUSTRIAL WATER SYSTEM AND METHOD FOR ITS USE

FIELD OF THE INVENTION

The field of the invention relates to accumulation and analysis of real time data, and maximizing corrosion/scaling/fouling inhibition and particulate dispersancy performance while minimizing cost of water and treatment chemicals so as to result in a more effective and efficient industrial water system. In particular it is related to real time controls for industrial water systems, such as but not limited to, cooling water systems, boiler systems, water reclamation systems and water purification systems.

BACKGROUND OF THE INVENTION

Abundant supplies of fresh water are essential to the development of industry. Enormous quantities are required for the cooling of products and equipment, for process needs, for boiler feed, and for sanitary and portable water supply. It is becoming increasingly apparent that fresh water is a valuable resource that must be protected through proper management, conservation, and use. In order to ensure an adequate supply of high quality water for industrial use, the following practices must be implemented: (1) purification and conditioning prior to consumer (portable) or industrial use; (2) conservation (and reuse where possible); (3) wastewater treatment.

The solvency power of water can pose a major threat to industrial equipment. Corrosion reactions cause the slow dissolution of metals by water and eventually structural failure of process equipment. Deposition reactions, which produce scale on heat transfer surfaces and cause loss of production, represent a change in the solvency power of water as its temperature is varied. The control of corrosion and scale is a major focus of water treatment technology.

Typical industrial water systems are subject to considerable variation. The characteristics of water composition can change over time. The abruptness and degree of change depend upon the source of the water. Water losses from a recirculating system, changes in production rates, and chemical feed rates all introduce variation into the system and thereby influence the ability to maintain proper control of the system.

Typically, given a particular calcium ion content in water, a treatment comprised of an inorganic orthophosphate together with a water soluble polymer is used to form a protective film on metallic surfaces in contact with aqueous systems, in particular cooling water systems, to thereby protect such from corrosion. The water soluble polymer is critically important to control calcium phosphate crystallization so that relatively high levels of orthophosphate may be maintained in the system to achieve the desired protection without resulting in fouling or impeded heat transfer functions which normally be caused by calcium phosphate deposition. Water soluble polymers are also used to control the formation of calcium sulfate and calcium carbonate and additionally to dispense particulates to protect the overall efficiency of water systems.

U.S. Pat. No. 5,171,450, established a simplified recognition that the phenomenon of scaling or corrosion in cooling towers can be inhibited by selection of an appropriate polymer, or combination of polymers, as the treating agent. This was based on the fact that losses of the active polymer as a consequence of attrition due to protective film formation on equipment or avoiding deposits by adsorbing onto solid impurities to prevent agglomeration or crystal growth of particulates which can deposit on the equipment. In this patent, the active polymer is defined as the polymer measured by its fluorescent tags, and active polymer loss is defined by using an inert chemical tracer (measure of total product concentration) and subtracting active polymer concentration as indicated from tagged polymer level. Thus, the control of corrosion and scaling is accomplished by control of active polymer at a level where active component losses are not excessive.

In U.S. Pat. No. 6,153,110, polymer inhibition efficiency was defined, i.e. the ratio of free polymer level to total polymer level. In defining free and total polymer levels, the polymer lost from the system undetected by sampling the system water was excluded initially, then free polymer was defined as unreacted polymer, and bounded polymer was defined as both polymer associated with inhibited particles (functioning as a scale inhibitor) and polymer absorbed onto undeposited scale (functioning as a dispersant). The free and bounded polymer together comprised the total polymer present in the water system. A correlation was established between % polymer inhibition efficiency and % scale inhibition, and between % polymer inhibition efficiency and % particulate dispersion. Thus, the control of scaling and deposition was accomplished by controlling at the required ratio of free polymer level to total polymer level.

U.S. Pat. No. 5,171,450 and U.S. Pat. No. 6,153,110 took an over simplified viewpoint of the problems to be addressed. In reality, the primary factors for scaling control are pH, hardness and temperature, while the polymer is the secondary factor. See for example Table I below, showing different active polymer concentrations required at different pH levels. By not controlling the primary effect of pH on scaling, in case of increasing pH, control wind up results in an uneconomical consumption of polymer.

TABLE I

| pH | Required active polymer conc., ppm |
|---|---|
| 7.2 | 2 |
| 7.4 | 4 |
| 7.6 | 7 |
| 7.8 | 12 |

Additionally, the present inventors have noted that the controlled variables in U.S. Pat. No. 5,171,450 and U.S. Pat. No. 6,153,110 have no direct linkage to site specific key performance parameters such as corrosion and scaling. Every industrial water system is unique. In operating systems, proper treatment often requires constant adjustment of the chemistry to meet the requirements of rapidly changing system conditions. What is a suitable target of polymer loss or % polymer inhibition efficiency for one system at one time may not be suitable for the same system at another time or for another system. Without direct measurement of performance, polymer concentration monitoring provides no assurance for site specific performance.

A third issue with the processes currently available is that monitoring of polymer concentration, and its derivatives such as polymer loss and % polymer inhibition efficiency, cannot detect localized scaling at hot surfaces, which is only correlated with the absolute amount of polymer loss over specific surfaces. The smaller the surface, the larger the system volume, the less likely the absolute amount of polymer loss due to localized scaling is reflected in polymer concentration changes. For example, in a 30-liter lab testing unit, a hot tube of 0.5 in diameter and 5 in length is heavily scaled. Yet, the absolute polymer loss at the surface divided by the system volume is not reflected in polymer concentration change. For instance, if the same surface to volume ratio applies to a real world cooling tower of 450,000 gal, then the absolute amount of polymer loss due to scaling at 3000 ft$^2$ heat transfer surface is un-observable from polymer concentration changes.

A fourth concern is that, a feedback control of polymer level based on polymer loss and % polymer inhibition efficiency would likely result in an uneconomical consumption of polymer. Adding polymer does not help reduce the absolute amount of bounded polymer already existing in the system, simply because polymer that bounds to undeposited scale will not be released from scale. The reduction of the absolute amount of bounded polymer only depends on system blowdown rate. To achieve the same % polymer inhibition efficiency requires a higher polymer level when bounded polymer is not fully depleted from the system. For instance, to achieve the same 90% polymer inhibition efficiency requires 10 ppm total polymer with 1 ppm bounded polymer, but 20 ppm total polymer with 2 ppm bounded polymer.

U.S. Pat. No. 6,510,368 and U.S. Pat. No. 6,068,012 proposed performance based control systems by directly measuring performance parameters such as corrosion, scaling and fouling, for the obvious reasons that monitoring inert chemical tracer leads to control wind down of active chemical, and monitoring active chemical leads to control wind up of total chemical feed, and neither provides assurance for site specific performance. In both patents, a decision tree was developed to diagnose from performance measurements the causes of performance degradation and take corrective actions accordingly.

A key disadvantage of the above performance based control systems is that they are reactive instead of proactive, in other words, corrosion, scaling and fouling are already actively occurring in the system. Moreover, corrosion, scaling and fouling are highly inter-correlated. Once commenced, one will trigger and intensify the other two, which may demand three or four times of more chemicals to bring the system back to its performance baseline, thus resulting in an uneconomical consumption of chemicals. Maintaining the health of an industrial water system proactively is more economical than trying to fix an unhealthy one. Therefore, what is still needed within the industry is a control system that is proactive instead or reactive, and therefore results in more efficient and economical processes.

SUMMARY OF THE INVENTION

A control system has been found that utilizes multiple measurements of information and models to decide optimal control actions to maximize corrosion/scaling/fouling inhibition and particulate dispersancy performance and minimize cost of water and treatment chemicals. This system is capable of automatic operation for a wide range of process conditions, ensures multiple performance objectives, achieves robust operation under a variety or un-measurable disturbances and achieves the least costly solution delivery.

In one embodiment, the present invention sets forth a control system for monitoring and controlling an industrial water system comprising (a) measuring at least one manipulated variable and at least one measured output representing a safe margin towards a performance boundary; (b) determining at least one dynamic transfer function between the at least one measured output and the at least one manipulated variable; (c) defining an index derived from current and future values of the at least one measured output and an index derived from current and future values of the at least one manipulated variable; (d) at each sampling time, utilizing a processor to maximize the index of the at least one measured output and minimize the index of the at least one manipulated variable to determine current and future values of the at least one manipulated variable; and (e) implementing current value of the at least one manipulated variable within the water system.

In an alternate embodiment, the invented control system (1) defines a special class of measured outputs as the safe margins towards performance boundaries (beyond which corrosion, scaling and fouling happen); (2) operates the industrial water system at a condition, where there are safe margins towards performance boundaries; (3) quantifies impacts of the unmeasured disturbances (makeup chemistry, heat stress, etc.) in terms of shrinking of the safe margins; (4) identifies dynamic transfer functions from the measured disturbances (makeup flow, blowdown flow, etc.) to the measured outputs; (5) identifies dynamic transfer functions from the manipulated variables (pumps, valves, etc.) to the measured outputs; (6) identifies the dependency of the safe margins on the measured outputs relative to water chemistry; (7) defines a performance index as a weighted summation of current and future values of the measured outputs and a cost index as a weighted summation of cost of water and treatment chemicals derived from current and future values of the manipulated variables, taking into account constraints on the measured outputs and the manipulated variables; (8) at each sampling time, maximizes the performance index and minimizes the cost index and determines current and future values of the manipulated variables; and (9) implements current values of the manipulated variables within the water system.

The various features of novelty which characterize the invention are pointed out with particularity in the claims annexed to and forming a part of this disclosure. For a better understanding of the invention, its operating advantages and benefits obtained by its uses, reference is made to the accompanying drawings and descriptive matter. The accompanying drawings are intended to show examples of the many forms of the invention. The drawings are not intended as showing the limits of all of the ways the invention can be made and used. Changes to and substitutions of the various components of the invention can of course be made. The invention resides as well in sub-combinations and sub-systems of the elements described, and in methods of using them.

BRIEF DESCRIPTION OF THE DRAWINGS

Refer now to the figures, which are meant to be exemplary and not limiting, and wherein like elements are numbered alike, and not all numbers are repeated in every figure for clarity of the illustration.

FIGS. 5A and 5B depict the effect of a model based control according to an embodiment of the invention.

DETAILED DESCRIPTION OF THE INVENTION

Figure 1:
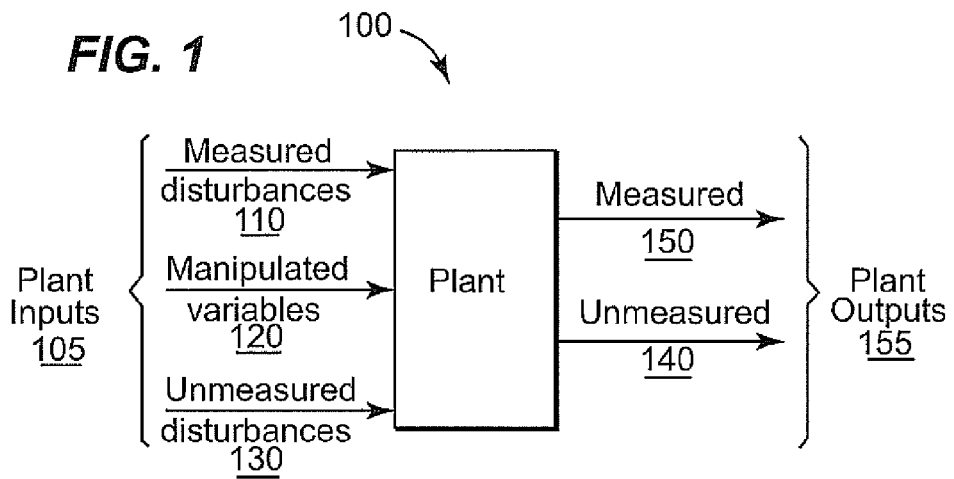
FIG. 1 is an illustration of an industrial water system with input and output signals.

While the present invention has been described with references to preferred embodiments, various changes or substitutions may be made to these embodiments by those ordinarily skilled in the art pertinent to the present invention without departing from the technical scope of the present invention. Therefore, the technical scope of the present invention encompasses not only those embodiments described above, but also all that fall within the scope of the appended claims.

Approximating language, as used herein throughout the specification and claims, may be applied to modify any quantitative representation that could permissibly vary without resulting in a change in the basic function to which it is related. Accordingly, a value modified by a term or terms, such as "about", are not limited to the precise value specified. In at least some instances, the approximating language may correspond to the precision of an instrument for measuring the value. Range limitations may be combined and/or interchanged, and such ranges are identified and include all the sub-ranges included herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements, but may include other elements not expressly listed or inherent to such process, method article or apparatus.

A control system has been found that measures at least one manipulated variable and at least one measured output representing a safe margin towards a performance boundary, determines at least one dynamic transfer function between the at lease measured output and the at least one manipulated variable, and defines an index derived from current and future values of the at least one measured output and an index derived from current and future values of the at least one manipulated variable. At each sampling time, the control system then utilizes a processor to maximize the index of the at least one measured output and minimize the index of the at least one manipulated variable, and determine current and future values of the at least one manipulated variable and then implements current value of the at least one manipulated variable within the water system. Although current and future values of the at least one manipulated variable are computed, the controller implements only the first computed value of the at least one manipulated variable, and repeats these calculations at the next sampling time.

In an alternate embodiment, a control system utilizes multiple measurements of information and models to decide optimal control actions to maximize corrosion/scaling/fouling inhibition and particulate dispersancy performance and to minimize cost of water and treatment chemicals. This system is capable of automatic operation for a wide range of process conditions, ensures multiple performance objectives, and achieves robust operation under a variety or un-measurable disturbances while also achieving an economic objective.

Figure 2:
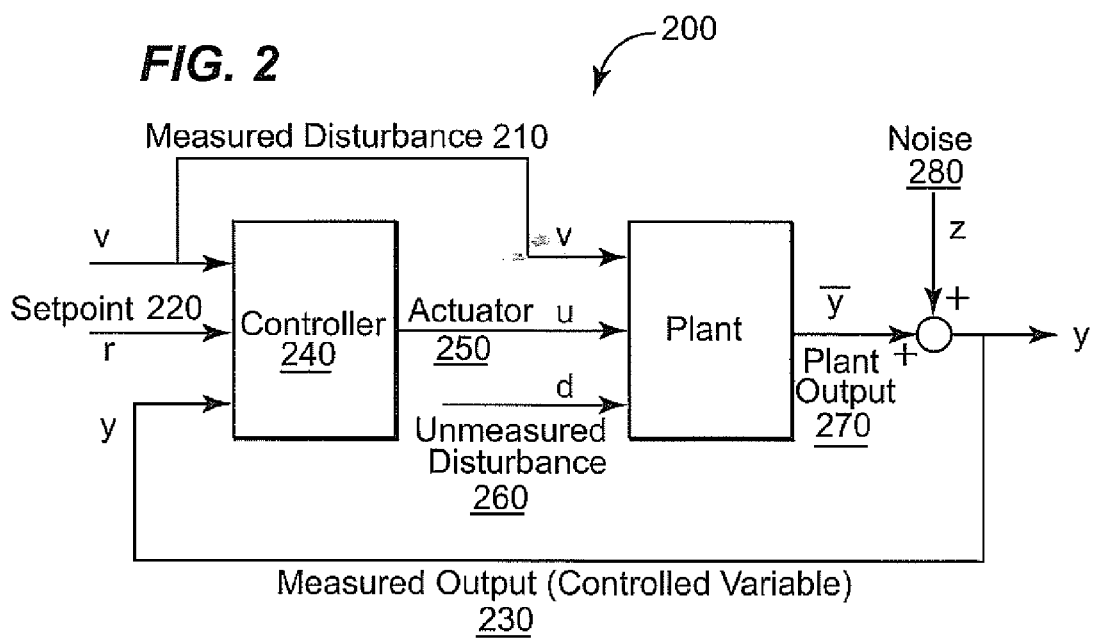
FIG. 2 is an illustration of a control structure for an industrial water system with input and output signals.

A fundamental difference between this invention and what is known from the prior art is that the presently claimed process is proactive and optimal in assuring site specific performance. An embodiment of the presently claimed control system is based on a comprehensive view of the industrial water system and its control structure. As shown in FIG. 1, the inputs 105 of the water system 100 are classified as measured disturbances 110, unmeasured disturbances 130, and manipulated variables 120; the outputs 155 of the water system are classified as measured outputs 150 and unmeasured outputs 140. As demonstrated in FIG. 2, the inputs of the control system 200 are classified as measured disturbances 210, set-points 220 and measured outputs 230, and the outputs of the control system are classified as manipulated variables. The unmeasured disturbances 260, are unknown but for their effect on the plant output 270. The controller, 240 provides feedback compensation for such disturbances. The set-points 220, or references are the target value for the output. The manipulated variable, or actuator 250, is the signal the controller 240 adjusts in order to achieve its objectives. The controller provides feed forward compensation for such measured disturbances 210 as they occur to minimize their impact on the output 270. The output 270 is the signal to be held at the setpoint. This is the "true" value, uncorrupted by measurement noise. Measurement output 230 is used to estimate the true value, or plant output 270. Measurement noise 280 represents electrical noise, sampling errors, drifting calibration and other effects that impair measurement precision and accuracy.

In an alternate embodiment, the invented control system (1) defines a special class of measured outputs as the safe margins towards performance boundaries (beyond which, for example, corrosion, scaling and fouling happen); (2) operates the industrial water system at a condition, where there are safe margins towards performance boundaries; (3) quantifies impacts of the unmeasured disturbances (such as, makeup chemistry, heat stress, etc.) in terms of shrinking of the safe margins; (4) identifies dynamic transfer functions from the measured disturbances (such as, makeup flow, blowdown flow, etc.) to the measured outputs; (5) identifies dynamic transfer functions from the manipulated variables (such as, pumps, valves, etc.) to the measured outputs; (6) identifies the dependency of the safe margins on the measured outputs related to water chemistry; (7) defines a performance index as a weighted summation of current and future values of the measured outputs and a cost index as a weighted summation of cost of water and treatment chemicals derived from current and future values of the manipulated variables, taking into account constraints on the measured outputs and the manipulated variables; (8) at each sampling time, maximizes the performance index and minimizes the cost index, and determines current and future values of the manipulated variables; and (9) implements current values of the manipulated variables within the water system. Although current and future values of the manipulated variable are computed, the controller implements only the first computed values of the manipulated variables, and repeats these calculations at the next sampling time.

Unlike the qualitative logic tree in the prior art, in this invention, the dynamic transfer functions in (4), (5) and (6) are quantified explicitly, therefore, a numeric optimization can be solved.

In one embodiment, a safe margin towards the scaling/fouling boundary is established by using a testing heat exchanger. On one side of the heat transfer surface is an electric heater, on the other side is a side stream of the water system. Both heat flow of the heater and water flow of the side stream are controlled at their set points. Therefore, an increase of temperature gradient between the surface and water represents onset of scaling/fouling. If we increase heat flow setpoint and/or decrease water flow setpoint such that the surface temperature is $\Delta T_1$ higher than the hottest surface in the water system and no scaling/fouling is detected, then $\Delta T_1$ is defined as the safe margin towards the scaling/fouling boundary of the water system. When unmeasured disturbances enter into the water system, the testing heat exchanger first detects scaling/fouling. Reduce the surface temperature by decreasing heat flow setpoint and/or increasing water flow setpoint such that scaling/fouling is suppressed and the surface temperature is $\Delta T_2$ higher than the hottest surface in the water system. Then, $(\Delta T_1 - \Delta T_2)$ represents the impact of un-measured disturbances on the scaling/fouling safe margin.

In one embodiment, a safe margin towards the corrosion boundary is established by using a testing corrosion probe. Externally impose an additional potential difference $\Delta E_1$ between cathodic and anodic electrodes and no corrosion is detected, then $\Delta E_1$ is defined as the safe margin towards the corrosion boundary of the water system. When un-measured disturbances enter into the water system, the testing corrosion probe first detects corrosion. Reduce the externally imposed potential difference to $\Delta E_2$ such that corrosion is suppressed. Then $(\Delta E_1 - \Delta E_2)$ represents the impact of unmeasured disturbances on the corrosion safe margin.

In one embodiment, the control system identifies dynamic transfer functions from the measured disturbances (e.g. makeup flow, blowdown flow, etc.) to the measured outputs (e.g. chemical concentrations), and dynamic transfer functions from the manipulated variables (e.g. pumps, valves, etc.) to the measured outputs (e.g. chemical concentrations). The dynamic transfer functions can be expressed as $$y_{w1}(t+1) = f_1(y_{w1}(\tau), y_{w2}(\tau), \ldots, u_1(\tau), u_2(\tau), \ldots, v_1(\tau), v_2(\tau), \ldots, \tau \leq t)$$

$$y_{w2}(t+1) = f_2(y_{w1}(\tau), y_{w2}(\tau), \ldots, u_1(\tau), u_2(\tau), \ldots, v_1(\tau), v_2(\tau), \ldots, \tau \leq t)$$

...

Where $y_{w1}$, $y_{w2}$, ... are the measured output related to water chemistry; $u_1$, $u_2$, ... are the manipulated variables; $v_1$, $v_2$, ... are unmeasured disturbances. The transfer functions are dynamic in that the measured outputs related to water chemistry depend on measured outputs, manipulated variables and measured disturbances at previous times.

Figure 3:
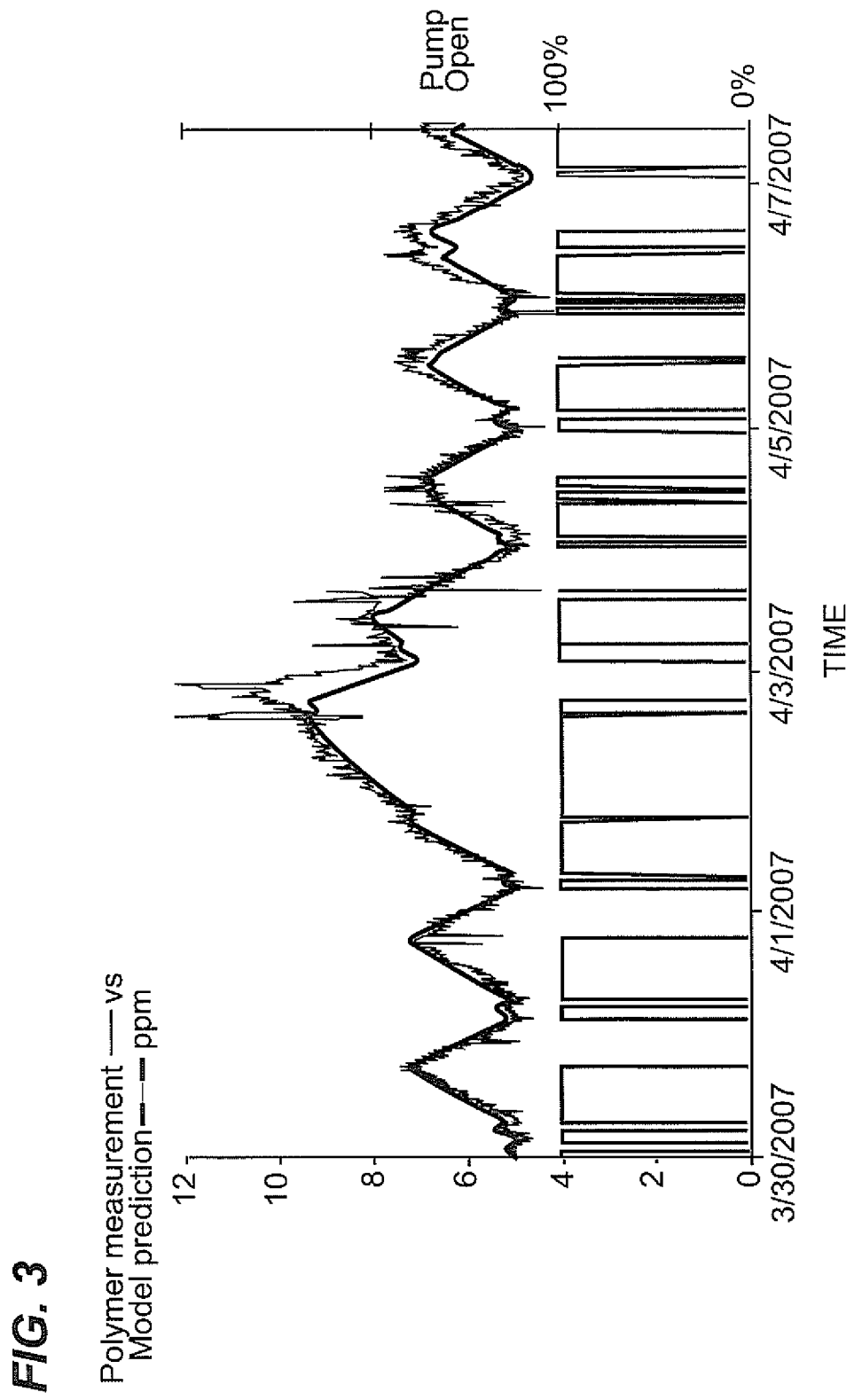
FIG. 3 shows that a dynamic transfer function from pump actions (manipulated variable) to chemical concentration (measured output) is identified, based on real time data of chemical concentration and pump actions

For example, a mass balance model for a chemical species X can be expressed as the amount of X accumulated in the system equals to the amount of X entering the system minus the amount of X leaving the system. The mathematical formula for such is:

$$V \frac{dC(t)}{dt} = -B(t) \cdot C(t) + F(t)$$

where V is system volume, B is blowdown flow, F is chemical feed flow, C is concentration of chemical species X in the system. Using a sampling time of $\Delta t$ and Euler's first order approximation for the derivative, i.e.

$$\frac{dC(t)}{dt} \approx \frac{C(t+1) - C(t)}{\Delta t}$$

the mass balance model can be expressed as $C(t+1) = f(C(t), F(t), B(t))$, i.e. chemical concentration (measured output) at time t+1 is a function of chemical concentration (measured output), chemical feed (manipulated variable) and blowdown (measured disturbance) at time t. Suppose constant blowdown, the model becomes $$\tau \frac{dC(t)}{dt} = -C(t) + C_{ss} \cdot \% \, pumpOpen(t)$$

where $\tau(=V/B)$. is system time constant, % pumpOpen is the percentage opening of a pump, $C_{ss}(=F/B)$ is steady state concentration if % pumpOpen equals to 100%. See FIG. 3, a dynamic transfer function from pump actions (manipulated variable) to chemical concentration (measured output) is identified as $$1613 \frac{dC}{dt} = -C + 11.7 \cdot \% \, pumpOpen,$$

based on real time data of chemical concentration and pump actions.

Figure 4:
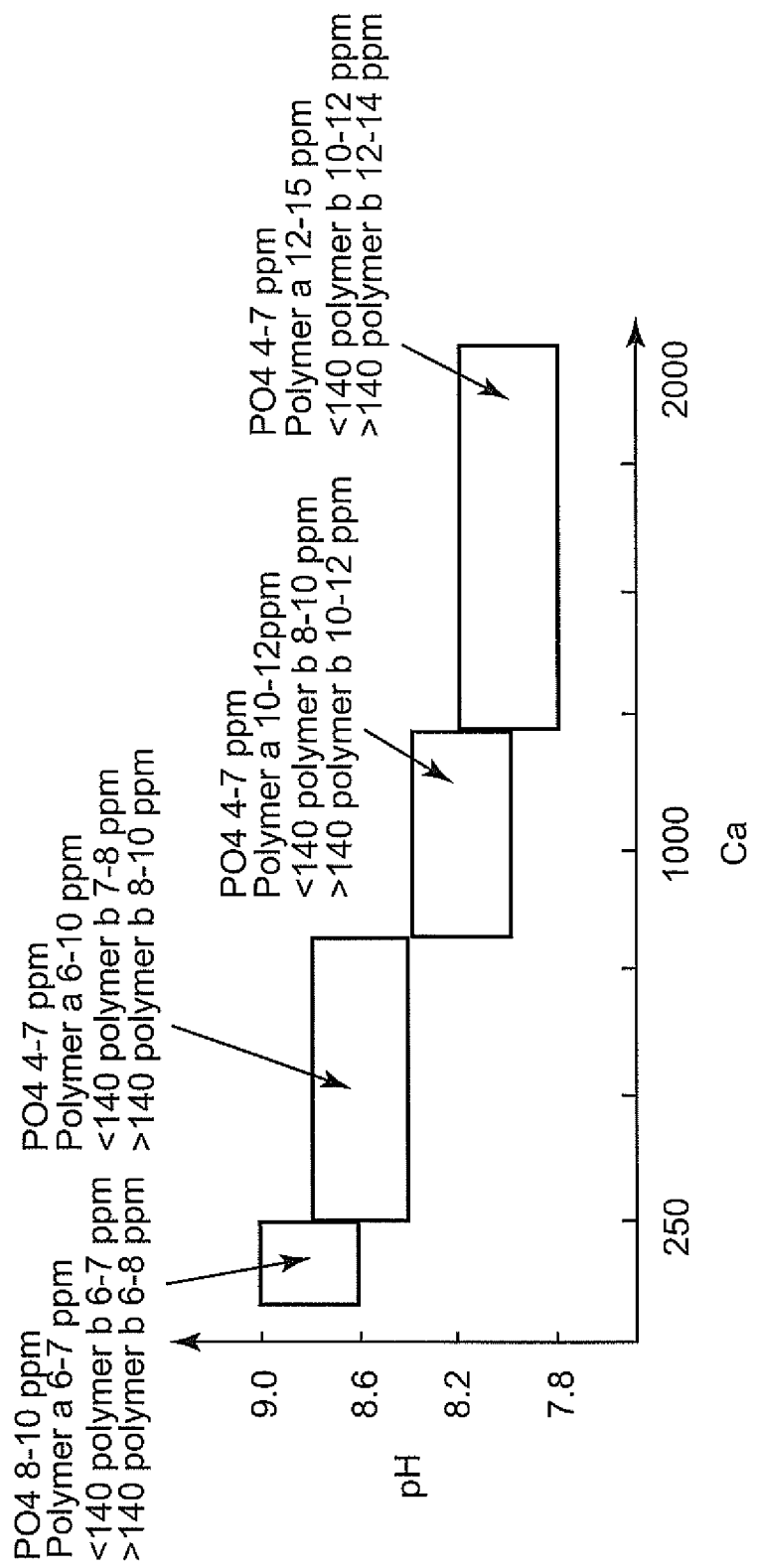
FIG. 4 is a depiction of various operating zones for an illustrative water treatment program.

By having an embodiment where the dynamics between chemical pump actions and chemical concentration in the system is identified, the controller can provide the optimal control decisions to move the system to the target-operating zone in minimum time or at minimum cost. FIG. 4 depicts various operating zones for an illustrative water treatment program. FIGS. 5A and 5B show further how a model based control system moves polymer concentration from 2 ppm to a target 4 ppm in minimum time while explicitly satisfying the pump opening constraints (i.e. 0<% pumpOpen<100%), as compared to ratio control, which feeds chemicals based on blowdown or makeup flow.

In one embodiment, the control system identifies the dependency of the safe margins on the measured outputs related to water chemistry. The dependency can be expressed as $$y_{s1} = g_1(y_{w1}, y_{w2}, \ldots)$$

$$y_{s2} = g_2(y_{w1}, y_{w2}, \ldots)$$

...

Where $y_{s1}$, $y_{s2}$, ... are the safe margins, $y_{w1}$, $y_{w2}$, ... are the measured output related to water chemistry. The nonlinear functions $g_1(\cdot)$, $g_2(\cdot)$ can be divided into several regions. Within each region, the nonlinear functions are approximated by their linear approximations, for example, for region $(y_{w1}, y_{w2}, \ldots) \in R^n$ $$\frac{\partial y_{s1}}{\partial y_{w1}}\bigg|_{(y_{w1}, y_{w2}, \ldots) \in R} = a_1, \frac{\partial y_{s1}}{\partial y_{w2}}\bigg|_{(y_{w1}, y_{w2}, \ldots) \in R} = a_2, \ldots$$

$$\frac{\partial y_{s2}}{\partial y_{w1}}\bigg|_{(y_{w1}, y_{w2}, \ldots) \in R} = b_1, \frac{\partial y_{s2}}{\partial y_{w2}}\bigg|_{(y_{w1}, y_{w2}, \ldots) \in R} = b_2, \ldots$$

Figure 6A:
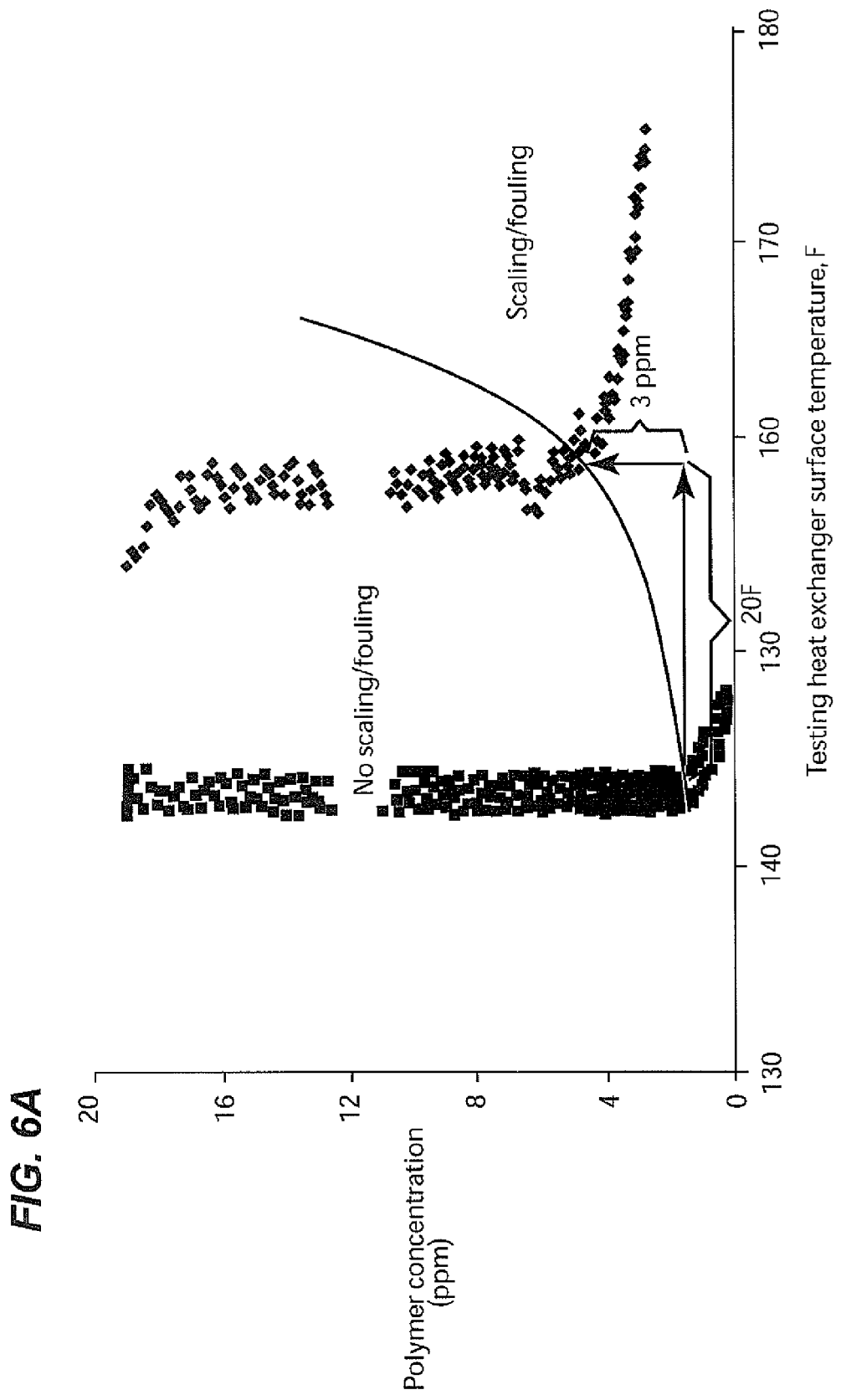
FIGS. 6A and 6B show pilot testing to identify scaling/fouling boundary and dependency of the fouling safe margin on water chemistry.
Figure 6B:
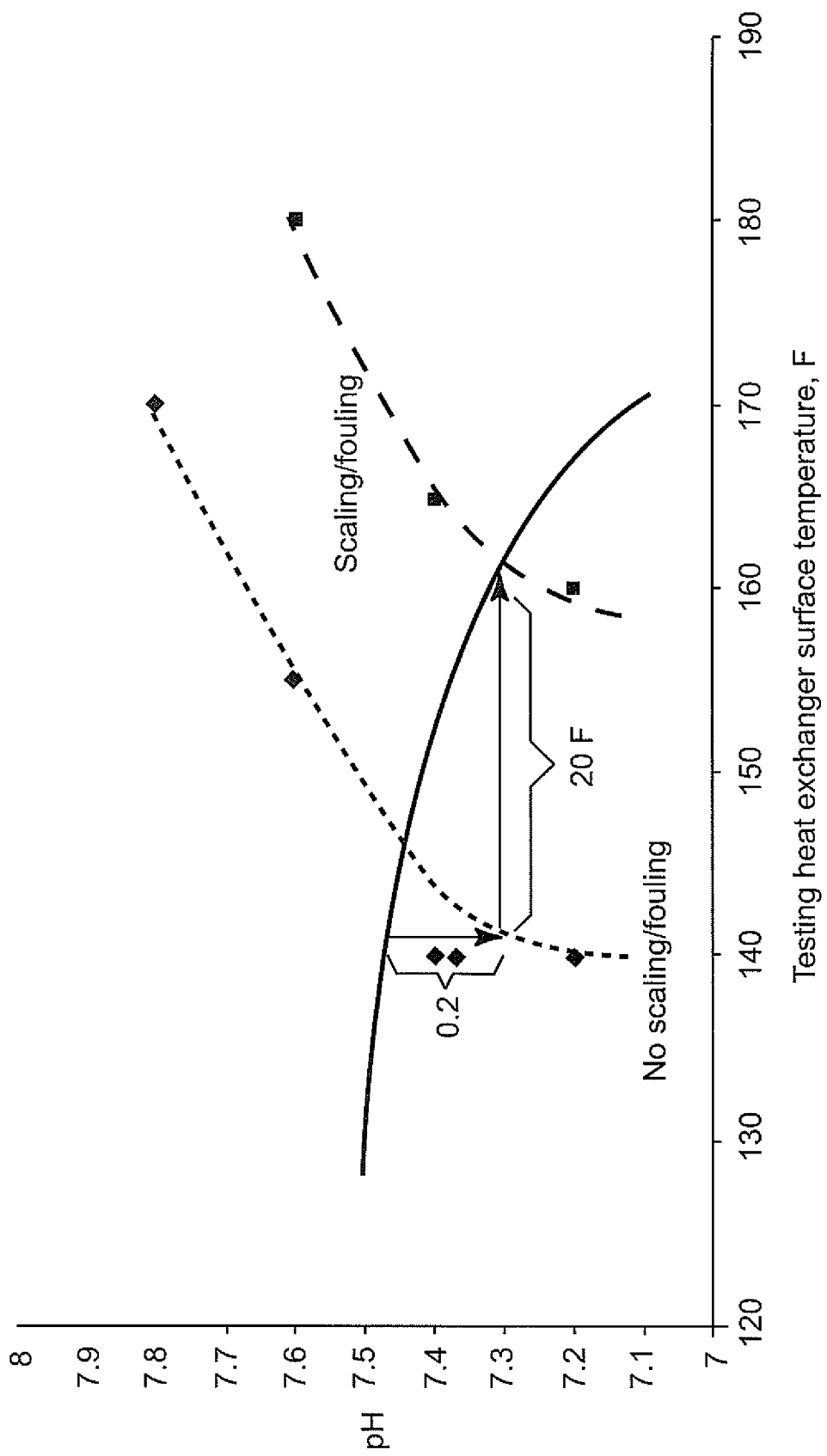

See FIGS. 6A and 6B. FIG. 6A depicts pilot tests, where the testing heat exchanger hot surface temperature began to increase dramatically after polymer concentration dropped to some threshold. Connecting the threshold values at different surface temperatures forms a boundary, beyond which scaling/fouling happens. FIG. 6B depicts pilot tests, where surface temperature began to increase dramatically after pH increased to some threshold. Connecting the threshold values at different surface temperatures forms a boundary, beyond which scaling/fouling happens. The dependency of the fouling/scaling safe margin on water chemistry for the region T=140~160 F, pH=7.5~7.7 and polymer=1-4 ppm can be expressed as an increase of 3 ppm polymer can provide 20 F in the fouling/scaling safe margin, or a 0.2 drop in pH can provide 20 F in the fouling/scaling safe margin.

In an embodiment of the invented control system, both testing heat exchanger and testing corrosion probe are operating closer to the performance boundaries. The control system accumulates data about the shrinking of the safe margins due to the unmeasured disturbances, and the expanding of the safe margins due to the manipulated variables and their impacts on the measured outputs related to water chemistry. From the real time accumulated data, the dependency of the safe margins on the measured outputs related to water chemistry can be identified.

In one embodiment, the control system defines a performance index as a weighted summation of current and future values of the measured outputs and a cost index as a weighted summation of cost of water and treatment chemicals derived from current and future values of the manipulated variables, taking into account constraints on the measured outputs and the manipulated variables. At each sampling time, the control system maximizes the performance index and minimizes the cost index, and determines current and future values of the manipulated variables, and implements current values of the manipulated variables within the water system. Although current and future values of the manipulated variable are computed, the controller implements only the first computed values of the manipulated variables, and repeats these calculations at the next sampling time. The mathematical formula for such is that at sampling time $t_0$, given $y_{w1}(\tau)$, $y_{w2}(\tau), \ldots, v_1(\tau), v_2(\tau), \ldots, \tau \leq t_0$, and $y_{s1}(t_0), y_{s2}(t_0)$, solve $$\max_{\substack{u_1(t_0), u_2(t_0), \ldots, \\ u_1(t_0+N), u_2(t_0+N), \ldots}} \sum_{t=t_0}^{t_0+N} \{[w_1 y_{s1}(t) + w_2 y_{s2}(t) + \ldots] - [c_1 u_1(t) + c_2 u_2(t) + \ldots]\}$$

$$y_{w1}(t+1) = f_1(y_{w1}(\tau), y_{w2}(\tau), \ldots, u_1(\tau), u_2(\tau), \ldots, v_1(\tau), v_2(\tau), \ldots, \tau \leq t)$$

$$y_{w2}(t+1) = f_2(y_{w1}(\tau), y_{w2}(\tau), \ldots, u_1(\tau), u_2(\tau), \ldots, v_1(\tau), v_2(\tau), \ldots, \tau \leq t)$$

$$\ldots$$

$$y_{s1} = g_1(y_{w1}, y_{w2}, \ldots)$$

$$y_{s2} = g_2(y_{w1}, y_{w2}, \ldots)$$

subject to $$\ldots$$

$$y_{w1}^L \leq y_{w1}(t) \leq y_{w1}^U, \; y_{w2}^L \leq y_{w2}(t) \leq y_{w2}^U, \ldots$$

$$y_{s1}^L \leq y_{s1}(t) \leq y_{s1}^U, \; y_{s2}^L \leq y_{s2}(t) \leq y_{s2}^U, \ldots$$

$$u_1^L \leq u_1(t) \leq u_1^U, \; u_2^L \leq u_2(t) \leq u_2^U, \ldots$$

$$t = t_0 \ldots t_0 + N$$

Where $t_0$ is current time, $t_0+N$ is the N step ahead in future; $w_i$ is the weight for the i th safe margin, $c_i$ is the cost associated with the i th manipulated variable; $y_{wi}^L$ and $y_{wi}^U$ are lower and upper limits for $y_{wi}$; $y_{si}^L$ and $y_{si}^U$ are lower and upper limits for $y_{si}$; $u_i^L$ and $u_i^U$ are lower and upper limits for $u_i$.

While the present invention has been described with references to preferred embodiments, various changes or substitutions may be made on these embodiments by those ordinarily skilled in the art pertinent to the present invention without departing from the technical scope of the present invention. Therefore, the technical scope of the present invention encompasses not only those embodiments described above, but all that fall within the scope of the appended claims.

What is claimed is:

1. A control system for monitoring and controlling a health of a heat transfer surface of a heat exchanger in an industrial water system, comprising:
   a testing heat exchanger comprising a test surface, wherein the testing heat exchanger is configured to detect scaling or fouling first in the control system;
   a temperature sensor configured to measure a maximum temperature $T_1$ the test surface can reach without triggering scaling or fouling of the test surface, the scaling or fouling being determined by an increase in heat resistance of the test surface; and
   a controller configured to compare the maximum temperature $T_1$ of the test surface and a temperature $T_0$ of the heat transfer surface, and to control at least one manipulated variable in response to the comparison between the maximum temperature $T_1$ and the temperature $T_0$,
   wherein the at least one manipulated variable comprises at least one selected from the group consisting of chemical feed rates, makeup water flow rate, blowdown water flow rate, and recirculating water flow rate, and
   wherein the controller is further configured to:
      receive data related to at least one measured disturbance, the at least one manipulated variable, and a temperature difference $\Delta T$ between the maximum temperature $T_1$ and the temperature $T_0$,
      utilize the data and predetermined dynamic correlations between the at least one measured disturbance and the temperature difference $\Delta T$ and between the at least one manipulated variable and the temperature difference $\Delta T$ to construct a performance index comprising a weighted summation associated with present and future predicted values of $\Delta T$ and a cost index comprising a weighted summation of present and future predicted costs associated with the at least one manipulated variable,
      adjust the at least one manipulated variable to simultaneously maximize the performance index and thereby reduce the present and future values of $\Delta T$, and
      minimize the cost index and thereby reduce the present and future predicted costs,
   wherein the at least one measured disturbance comprises at least one selected from the group consisting of composition changes of source water, water losses from a recirculating system, changes in production rates, changes in environment, and changes in system structure.

2. The control system of claim 1 wherein one or more dynamic transfer functions correlate the at least one measured disturbance and the temperature difference $\Delta T$.

3. The control system of claim 1 wherein one or more dynamic transfer functions correlate the at least one manipulated variable and the temperature difference $\Delta T$.

4. The control system of claim 1 wherein the future predicted values of $\Delta T$ are calculated from the temperature difference $\Delta T$, the at least one measured disturbance and the at least one manipulated variable.

5. The control system of claim 1 wherein the performance index and the cost index are functions of current and future predicted values of the at least one manipulated variable.

6. The control system of claim 1 wherein the controller, at each sampling time, determines current and predicted future values of the at least one manipulated variable and implements the current values of the at least one manipulated variable.

7. The control system of claim 1, wherein the maximization of the performance index and minimization of the cost index takes into account performance constraints to ensure proper performance of the control system.

8. The control system of claim 1, wherein the at least one manipulated variable is a feed rate of a chemical into an aqueous system in the industrial water system or a chemical concentration of the chemical in the aqueous system.

9. The control system of claim 8, wherein the chemical is an antifouling or antiscaling polymer.

10. The control system of claim 1, wherein the at least one manipulated variable is a feed rate of a chemical into an aqueous system in the industrial water system or a chemical concentration of the chemical in the aqueous system.

11. The control system of claim 10, wherein the chemical is an antifouling or antiscaling polymer.

12. The control system of claim 11, wherein the controller is configured to increase the iced rate of the polymer when the maximum temperature $T_1$ is lower than the temperature $T_0$ and to decrease the feed rate of the polymer when the maximum temperature $T_1$ is higher than the temperature $T_0$.

13. The control system of claim 10, wherein the chemical affects the pH of the aqueous system.

14. The control system of claim 1 wherein the industrial water system is a recirculating system.

15. The control system of claim 14 wherein the industrial water system is a cooling tower system or a boiler system.

* * * * *

UNITED STATES PATENT AND TRADEMARK OFFICE
CERTIFICATE OF CORRECTION

PATENT NO. : 8,489,240 B2
APPLICATION NO. : 11/833282
DATED : July 16, 2013
INVENTOR(S) : Wan et al.

Page 1 of 1

It is certified that error appears in the above-identified patent and that said Letters Patent is hereby corrected as shown below:

In the Specification:

In Column 8, Line 5, delete "$\tau(=V/B)$." and insert -- $\tau(=V/B)$ --, therefor.

In the Claims:

In Column 12, Line 14, in Claim 12, delete "iced" and insert -- feed --, therefor.

Signed and Sealed this
Fifteenth Day of October, 2013

Teresa Stanek Rea
*Deputy Director of the United States Patent and Trademark Office*